(No Model.)
D. KENNEDY.
COTTON SEED PLANTER.
No. 433,350. Patented July 29, 1890.
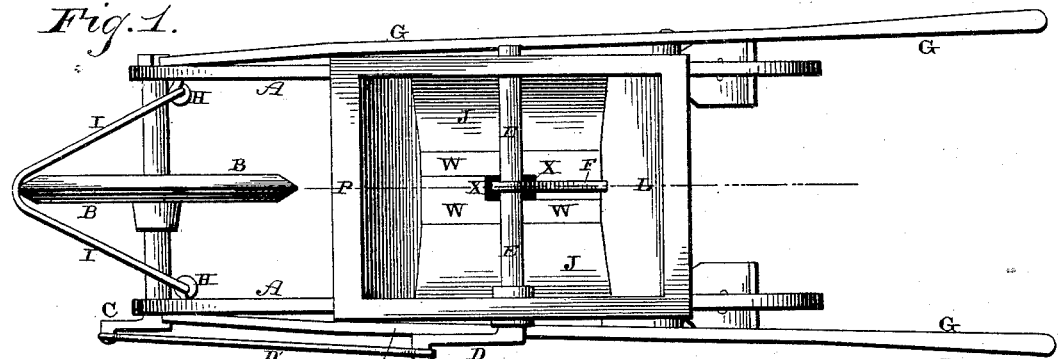
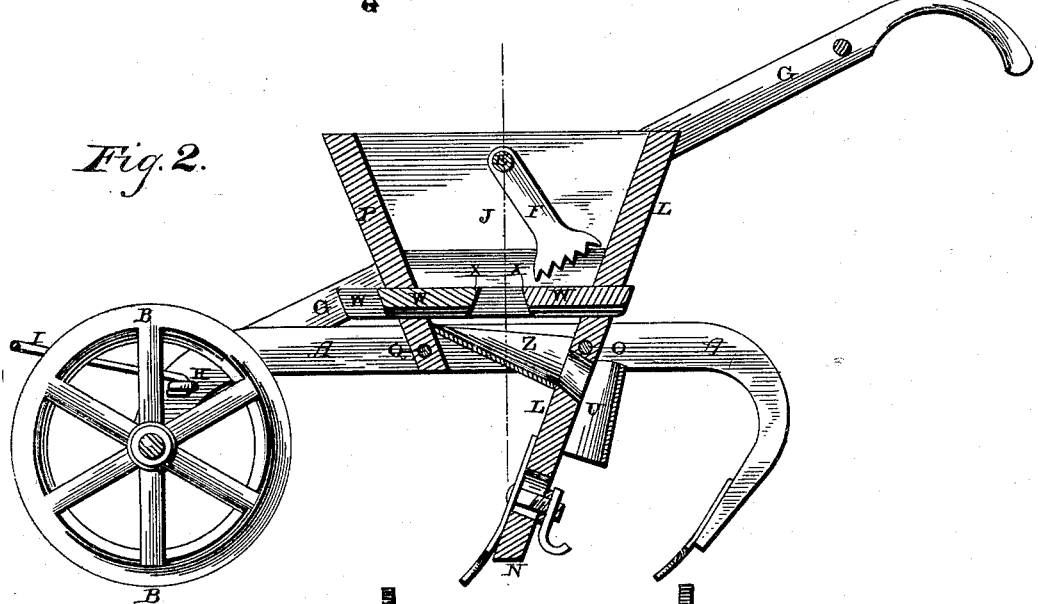
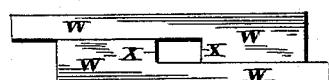
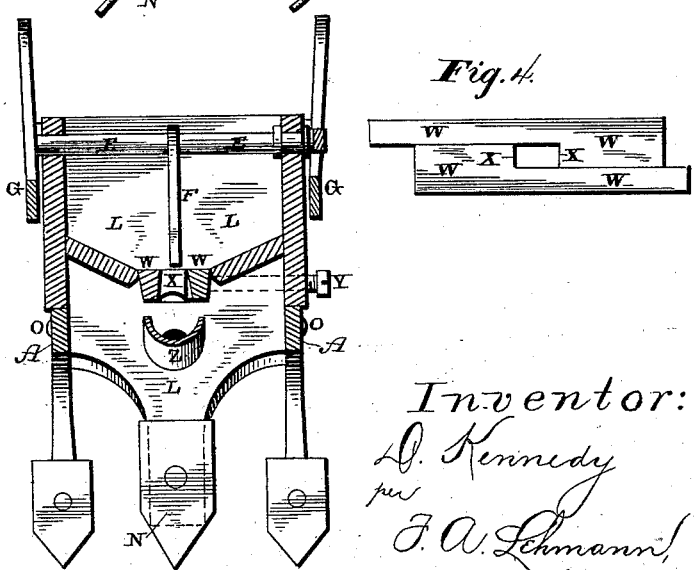
Witnesses:
E. P. Ellis,
A. Stevens Pattison
Inventor:
D. Kennedy
per
F. A. Lehmann,
Atty

UNITED STATES PATENT OFFICE.

DAVID KENNEDY, OF WACO, TEXAS.

COTTON-SEED PLANTER.

SPECIFICATION forming part of Letters Patent No. 433,350, dated July 29, 1890.

Application filed February 8, 1890. Serial No. 339,671. (No model.)

*To all whom it may concern:*

Be it known that I, DAVID KENNEDY, of Waco, in the county of McLennan and State of Texas, have invented certain new and useful Improvements in Cotton-Seed Planters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-seed planters; and it consists in, first, a hopper having its rear side or board extended downward so as to form the standard or furrow-opener; second, the combination of two endwise adjustable castings provided with shoulders or offsets, and which are made adjustable in relation to each other, and by means of which the quantity dropped is regulated, and, third, in the arrangement and combination of parts which will be more fully described hereinafter.

The objects of my invention are to extend the rear side of the seed-box downward, so as to form a furrow-opener or standard, to attach the combined seed-box and standard to the two iron beams, by which it is supported by clamping-bolts which pass entirely through them, and to produce a cheap and simple device by means of which the quantity of seed planted can be readily regulated.

Figure 1 is a plan view of a planter which embodies my invention. Figs. 2 and 3 are vertical sections of the same, taken at right angles to each other. Fig. 4 is a detached view of the slides W.

A represents the two beams, which are curved downward at their front ends, so as to form bearings for the shaft of the wheel B. Formed upon or secured to one end of this shaft is the crank C, to which the connecting-rod D' is fastened. The rear and outer end of this rod C is connected to a longer crank D, which is secured to one end of the shaft E, which extends through the top of the seed-box, and has the stirring device F secured thereto. The revolutions of the wheel B cause the cranks and the connecting-rod to keep the seed-stirrer in motion for the purpose of preventing the seed from becoming clogged. The handles G are rigidly secured to the side of the seed-box, and have their front ends bolted to the front ends of the beams A by means of the eyebolts H, to which the bent draft-rod I is attached.

The seed-box J has its rear side L to extend on down below the bottom of the seed-box, where it is reduced in size, so as to form a standard or furrow-opener N, and thus prevent the necessity of having to use separate and distinct parts, as has heretofore been done. By this construction the planter is greatly simplified and cheapened in construction, for the extension of the lower end of the board forms all of the standard necessary. To the lower end of the standard N is secured a shovel of any suitable construction. Through the two beams A and this board L is passed a bolt O, by means of which the seed-box is partially secured in position. The front end board P of the box also projects down below the bottom of the seed-box, and is clamped in position by means of a bolt Q, which passes through the lower end of the board and the beams. The seed-box is supported upon and secured to the beams, and the beams are held in their relative arrangement to each other by means of these two clamping-bolts. As will be seen, this construction greatly simplifies and cheapens the cost of the planter.

Placed in between the two slanting portions of the bottom are the two endwise-moving slides W, which are reduced in width at their ends in such a manner as to form the shoulders X, and the space between these shoulders forms the opening through which the seed drop. These slides are inserted into position from opposite ends of the seed-box, and are made adjustable in relation to each other, so as to regulate the size of the opening, and thus regulate the amount of seed dropped. After the two slides have been adjusted into their proper relation with each other they are locked in position by means of the set-screw Y, which is passed through the end of the seed-box, as shown.

The seed drops into the conductor Z, placed underneath the bottom of the seed-box, and conducts them through the opening made in the upper portion of the standard. Secured to the rear side of the standard is the guide U, which changes the direction of the seed as they fall and causes them to drop directly behind the standard in the furrow formed for this purpose. The shovels on the rear end of the beams A cover the seed as the machine moves forward.

Having thus described my invention, I claim—

1. The combination of the seed-box having its rear end or side extended downward, so as to form a standard, and provided with an opening through the upper portion of the standard, the conductor located under the seed-box, and the guide applied to the rear side of the standard, substantially as specified.

2. In a seed-planter, the combination of the seed-box having its rear end extending down and forming a standard for the opener, and having a transverse opening therein below the bottom of the box, and a conductor located beneath the box, which connects at its rear end with the said opening, whereby the seed falling from the box are conducted to the opening, substantially as shown.

In testimony whereof I affix my signature in presence of two witnesses.

DAVID KENNEDY.

Witnesses:
MAURICE DAWSON,
W. W. DARBY.